Figure 1:
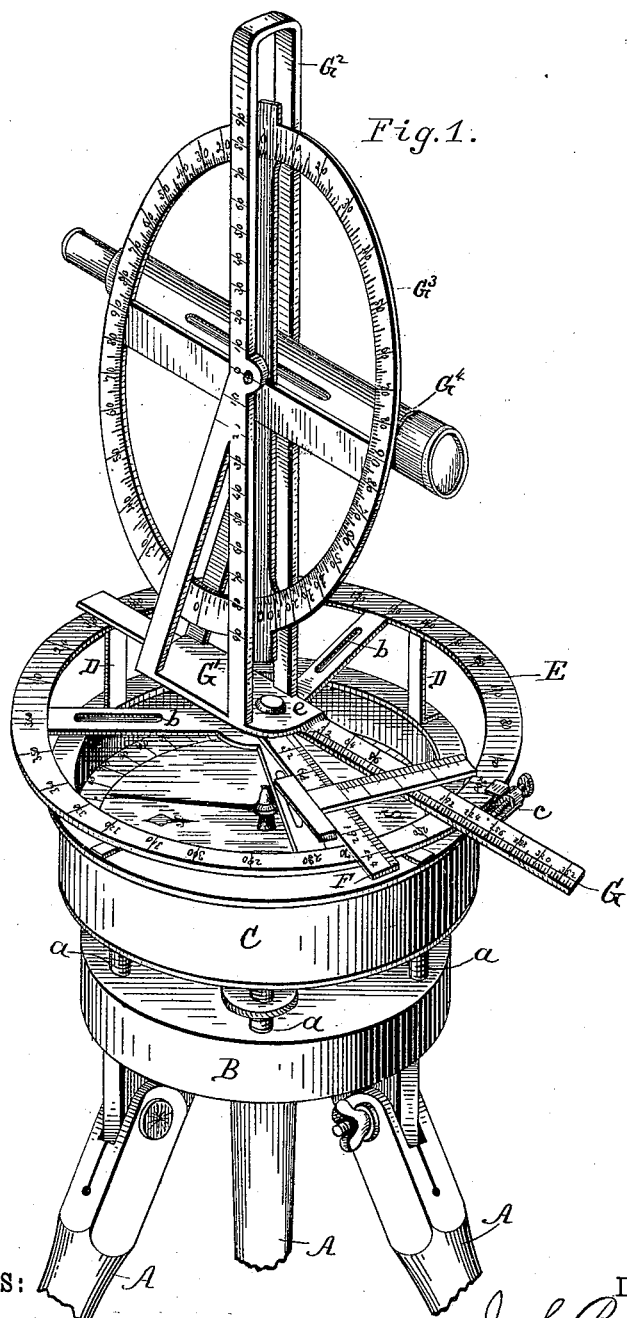

(No Model.)  3 Sheets—Sheet 1.

J. L. BUFORD.
DISTANCE INSTRUMENT.

No. 330,818.  Patented Nov. 17, 1885.

WITNESSES:
Thos Houghton.
Edw. W. Byrn.

INVENTOR:
J. L. Buford
BY Munn & Co
ATTORNEYS.

(No Model.)  3 Sheets—Sheet 2.
J. L. BUFORD.
DISTANCE INSTRUMENT.
No. 330,818.  Patented Nov. 17, 1885.
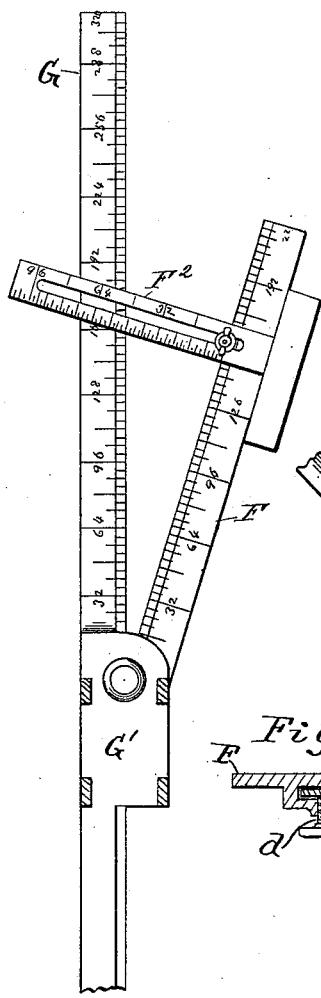
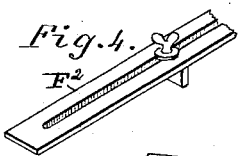
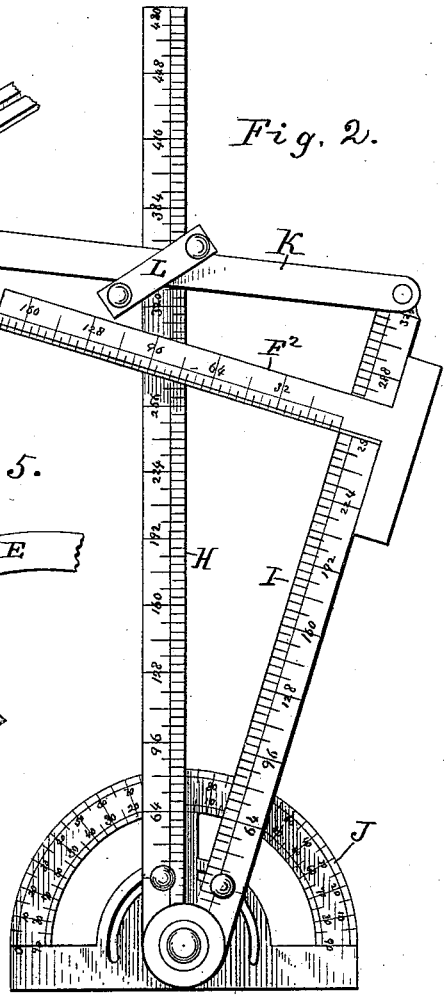
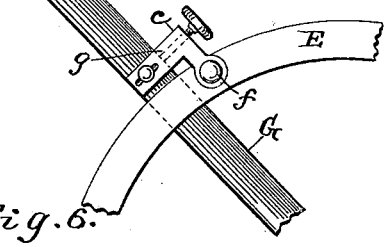
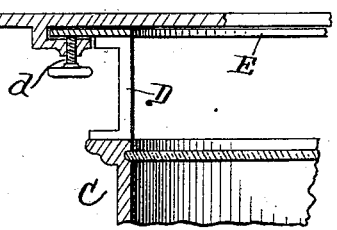
WITNESSES:  INVENTOR:

(No Model.) 3 Sheets—Sheet 3.
J. L. BUFORD.
DISTANCE INSTRUMENT.
No. 330,818. Patented Nov. 17, 1885.
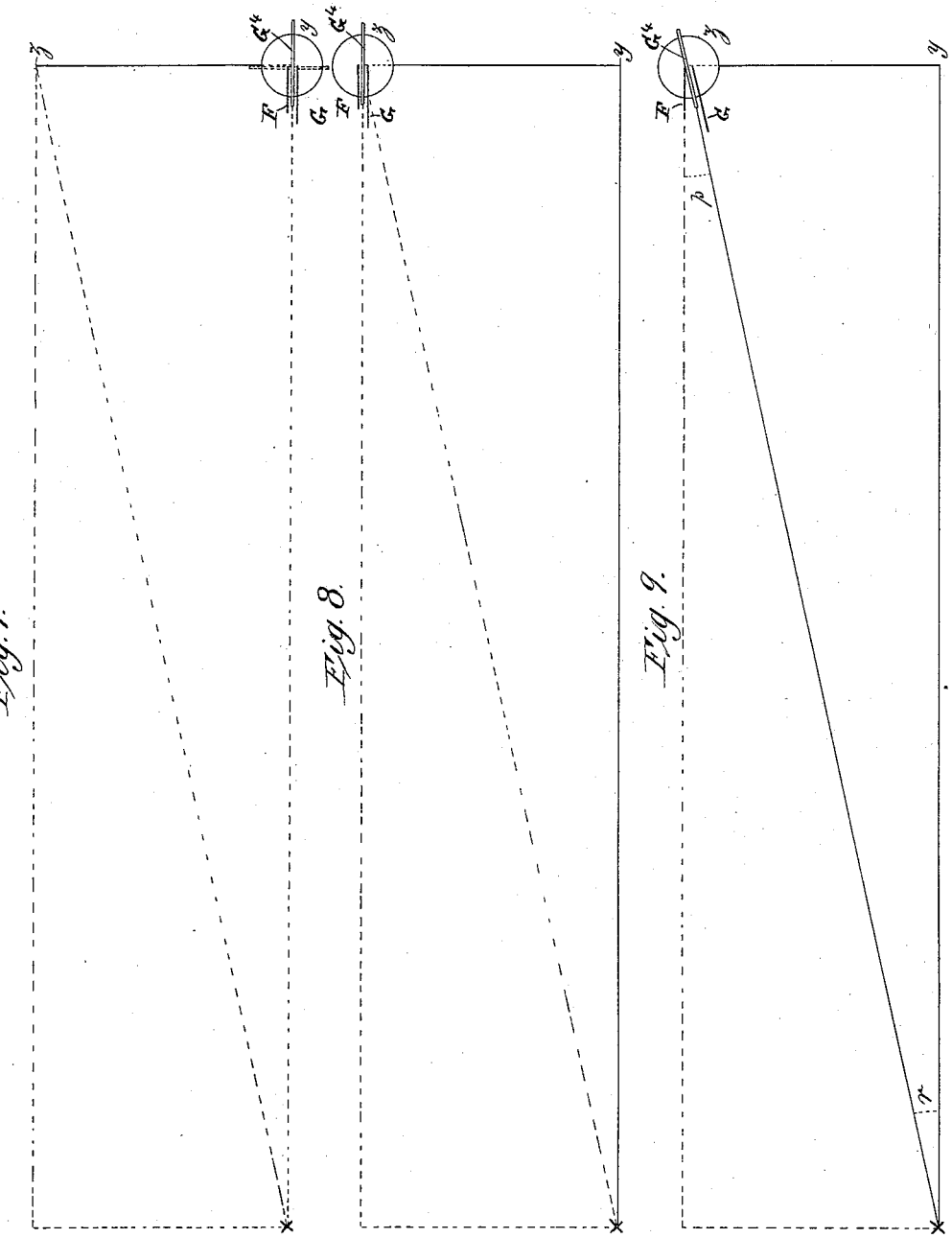

UNITED STATES PATENT OFFICE.

JEFFERSON L. BUFORD, OF ALBANY, TEXAS.

DISTANCE-INSTRUMENT.

SPECIFICATION forming part of Letters Patent No. 330,818, dated November 17, 1885.

Application filed July 18, 1885. Serial No. 171,965. (No model.)

*To all whom it may concern:*

Be it known that I, JEFFERSON L. BUFORD, a citizen of the United States, residing at Albany, in the county of Shackelford and State of Texas, have invented a new and useful Improvement in Surveyors' Instruments, of which the following is a description.

Figure 1 is a perspective view of the instrument. Fig. 2 is a plan view of a modification. Fig. 3 is a plan view of the arms G and F and bar $F^2$ for measuring the triangle. Fig. 4 shows in perspective a different form of bar $F^2$. Fig. 5 is a detail showing the means for fixing arm G in its adjustment on ring E. Fig. 6 is a sectional view showing means for fixing arm F to ring E; and Figs. 7, 8, and 9 are diagrams illustrating the mode of using my improved instrument.

The object of my invention is to provide an instrument for surveyors' use which will permit the distance from a given spot to a remote point to be quickly determined, and in a more accurate and definite manner than heretofore, and which will dispense with the traverse-table, table of logarithms, and the chain-carrying.

It consists, mainly, in the peculiar construction and arrangement of a horizontal graduated ring, a telescope mounted upon a frame made adjustable about a vertical axis, and having attached to this frame a radial graduated bar moving with the telescope-frame over the horizontal ring, and having means for securing it thereto adjustably, and another smaller graduated radial arm swiveling about the same vertical center and moving over and adapted to be adjustably secured to the horizontal ring, and a measure or gage for subtending the angle between the two radial arms, all as hereinafter more fully described.

In the drawings, A A represent the legs of the tripod jointed to the platform or table B, upon which is pivoted a horizontally-turning compass, C, provided with leveling-screws $a\,a$. Upon this compass is supported by legs D a horizontal graduated ring, E, divided into three hundred and sixty degrees, and provided with spirit-levels $b\,b\,b$ for the compass. The central connection of these spirit-levels forms a turn-table, upon which is pivoted about a vertical center by a bolt, $e$, an upright frame, G', having attached thereto a horizontal radial graduated arm, G, which is free to move over the graduated ring, and may be fixed in any position on said ring by set-screw $f$, Fig. 5, which is carried in a right-angular bracket, $g$, attached adjustably to arm G by graduating-screws $c$.

F is another horizontal radial graduated arm, which turns about the same center, $e$, as arm G, and moves over the ring E in the same way. This arm F may also be fixed to any adjustment on ring E by a screw, $d$, underneath the same. (See Fig. 6.)

On the bar F, and between bars F and G, is another graduated bar, $F^2$, (see Figs. 1 and 3,) which is adjustable on bar F.

On a horizontal axis in the upright frame $G^2$ is mounted the telescope $G^4$, which is always in the same vertical plane with graduated bar G. Beside this telescope and to it is affixed a graduated ring, $G^3$, which closely fits against one of the vertical sides of the frame $G^2$, which side is also graduated.

The mode of using my instrument is as follows, reference being had to the diagram views, Figs. 7, 8, and 9, in which the positions of the long arm G, short arm F, and telescope $G^4$ are merely indicated: The instrument is placed at $y$, Fig. 7, and the distant object $x$ is sighted through the telescope. The telescope is then turned ninety degrees, as shown in dotted lines, to give the right angle, and a base-line, $y\,z$, of a definite distance is measured off and a stake driven at $z$. The telescope $G^4$ is now brought back to the distant object $x$, and the long arm G is then also pointing at it. In this position the long arm G is fixed on the ring E by its set-screw. Short arm F is then brought up flat against and parallel with long arm G, and is also fastened to ring E by its set-screw. The instrument is now taken to the other end of the base-line and is placed at $z$, as in Fig. 8. The set-screw of the long arm being now loosened, it and the telescope are moved ninety degrees, or at right angles to short arm F, and there the long arm is again fixed by its set-screw to ring E. The telescope is now brought to bear on the original position $y$, and it is now known that the short arm is pointing at right angles to base-line $y\,z$, and parallel with the line $x\,y$ of first observation. The long arm G is then again released from ring E, and it and the telescope are pointed at the remote object $x$, as in Fig. 9, the short arm F being left stationary and pointing parallel to the line $x\ y$. In this position the long arm is fixed again, and it is now known that the angle between the long and short arms F and G, as shown at $p$, is equal to the angle formed between the lines $x\ y$ and $x\ z$ at the remote object, as shown at $r$. The graduated base-bar $F^2$, Fig. 3, is now applied to the bar F at right angles, and the distance of base-line $y\ z$ being noted thereon, this bar $F^2$ is slid up bar F until the distance of that base-line stretches from bar F to G and strikes the bar G. At the point where it strikes bar G it measures on the latter the distance of the hypotenuse $x\ z$, and at the point where bar $F^2$ rests on bar F the latter measures the distance of the side $x\ y$ of the triangle, or the distance from the first point of observation to the remote object, the graduations of the three arms G, F, and $F^2$ being previously adapted or correlated to indicate these distances.

For measuring by triangulation in a vertical plane the graduated frame $G^2$ and ring $G^3$ are used. In this case, however, the base line is remote from the point of observation, being the known vertical height of some object.

Instead of the construction shown in Fig. 1, I may use a construction such as is shown in Fig. 2, in which the frame J corresponds to the graduated ring E, Fig. 1, the arm H to arm G, Fig. 1, and the arm I to arm F, Fig. 1. In this construction, which is used for measuring on a large scale, the long bars H and I are provided with a guide-bar, K, and yoke L. I may also construct the base-line bar $F^2$ as shown in Fig. 4.

In making use of my invention it is not essential that the compass should form a part of the same, and it may be omitted or used, as desired.

Having thus described my invention, what I claim as new is—

1. The combination, with the horizontal graduated ring E, of the centrally-pivoted telescope-frame bearing a telescope, and having a graduated radial arm, G, arranged to move over the ring, and provided with means for fixing it to the ring, and an independent centrally-pivoted graduated arm, F, also arranged to move over the ring, and provided with means for fastening it to the ring, substantially as and for the purpose described.

2. The combination, with the horizontal graduated ring E, of the centrally-pivoted telescope-frame bearing a telescope, and having a graduated radial arm, G, arranged to move over the ring, and provided with means for fixing it to the ring, an independent centrally-pivoted graduated arm, F, also arranged to move over the ring, and provided with means for fastening it to the ring, and the graduated base-line bar $F^2$, arranged to subtend the angle of the two bars G F, as and for the purpose described.

3. The combination of the compass C, having uprights D, the graduated ring E, mounted thereon and having radial arms, with spirit-levels $b$, the centrally-pivoted telescope-frame $G'\ G^2$, carrying a telescope and graduated arm G in the same vertical plane, the centrally-pivoted arm F, and the graduated base-line bar $F^2$, as and for the purpose described.

4. The combination, with the graduated ring E, of the centrally-pivoted telescope-frame $G'\ G^2$, bearing graduated horizontal radial arm G, the centrally-pivoted arm F, and the telescope $G^4$, hung in the graduated frame $G^2$, and having attached thereto the graduated ring $G^3$, arranged to move in a vertical plane, substantially as and for the purpose described.

5. The combination, with the frame J, of the bars H and I, guide-bar K, yoke L, and base-line bar $F^2$, as and for the purpose described.

J. L. BUFORD.

Witnesses:
SOLON C. KEMON,
JESSE MIDDLETON.